(12) United States Patent
Roesgen

(10) Patent No.: US 9,656,194 B2
(45) Date of Patent: May 23, 2017

(54) FILTER FOR FILTERING FLUIDS, FILTER CUP AND FILTER HEAD

(71) Applicant: MANN+HUMMEL GMBH, Ludwigsburg (DE)

(72) Inventor: André Roesgen, Remshalden (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 775 days.

(21) Appl. No.: 13/653,583

(22) Filed: Oct. 17, 2012

(65) Prior Publication Data

US 2013/0081990 A1    Apr. 4, 2013

Related U.S. Application Data

(63) Continuation of application No. PCT/EP2011/067292, filed on Oct. 4, 2011.
(Continued)

(51) Int. Cl.
*B01D 35/30* (2006.01)
*B01D 35/153* (2006.01)
(Continued)

(52) U.S. Cl.
CPC .......... *B01D 35/30* (2013.01); *B01D 35/005* (2013.01); *B01D 35/153* (2013.01); *B01D 46/0089* (2013.01); *B01D 46/2411* (2013.01); *B01D 2201/302* (2013.01); *B01D 2201/4015* (2013.01); *B01D 2201/4046* (2013.01); *B01D 2265/022* (2013.01); *B01D 2265/026* (2013.01)

(58) Field of Classification Search
None
See application file for complete search history.

(56) References Cited

U.S. PATENT DOCUMENTS 5,876,600 A * 3/1999 Matsubara et al. ........... 210/443
6,966,986 B1  11/2005 Lackey
(Continued)

FOREIGN PATENT DOCUMENTS

EP      844012 A2 *  5/1998
GB     1296051 A    11/1972
(Continued)

OTHER PUBLICATIONS

PCT ISR of PCT/EP2011/067292, Nov. 30, 2011.

*Primary Examiner* — Thomas M Lithgow
(74) *Attorney, Agent, or Firm* — James Hasselbeck

(57) ABSTRACT

A filter has a filter cup, a filter element arranged in the filter cup, and a filter head. Filter cup and filter head are connected by a releasable bayonet-type connection with interacting locking parts connected to filter cup and filter head. A locking nose on the first locking part and a recess on the second locking part interact. The recess has an insertion/removal region for joining and separating locking nose and recess and also a locking region for hooking the locking nose. A spring between filter cup and filter head generates pretension on the locking nose in the recess. The recess has a locking shoulder with a shoulder tip between locking region and insertion/removal region. The locking nose has a locking tip. When locking tip and shoulder tip contact each other, the locking nose is forced by the spring into the locking region or into the insertion/removal region.

9 Claims, 10 Drawing Sheets

Related U.S. Application Data

(60) Provisional application No. 61/547,779, filed on Oct. 17, 2011.

(51) Int. Cl.
*B01D 35/00* (2006.01)
*B01D 46/00* (2006.01)
*B01D 46/24* (2006.01)

(56) References Cited

U.S. PATENT DOCUMENTS

| | | |
|---|---|---|
| 2003/0127384 A1* | 7/2003 | Kapur .................. 210/235 |
| 2004/0232064 A1 | 11/2004 | Wilkinson |
| 2008/0053884 A1 | 3/2008 | Marshall et al. |
| 2008/0142426 A1* | 6/2008 | Greco et al. ............... 210/234 |

FOREIGN PATENT DOCUMENTS

| | | |
|---|---|---|
| JP | 06-085007 U | * 12/1994 |
| JP | 2005-349283 A | * 12/2005 |

\* cited by examiner

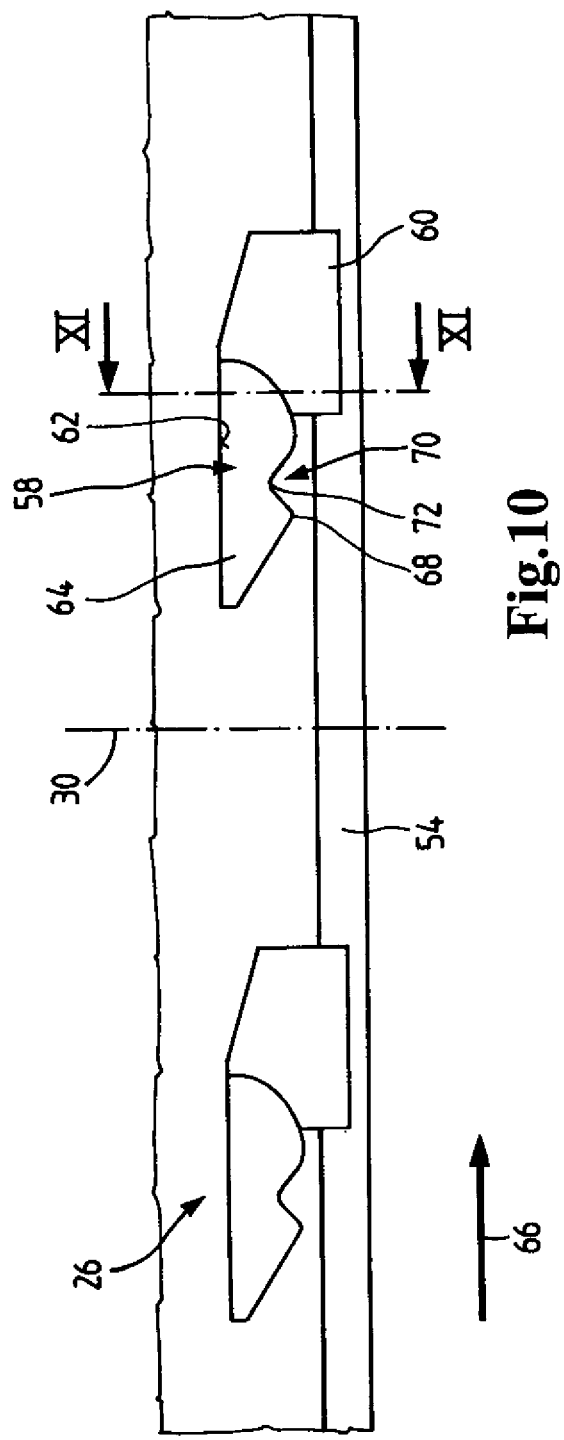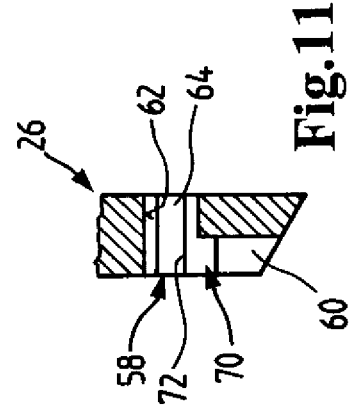

US 9,656,194 B2

FILTER FOR FILTERING FLUIDS, FILTER CUP AND FILTER HEAD

CROSS REFERENCE TO RELATED APPLICATIONS

This application claims priority to U.S. Provisional Patent Application No. 61/547,779 filed Oct. 17, 2011, the entire disclosure of which is incorporated herein by reference. The present application claims priority to Internation Application PCT/EP2011/067292 filed Oct. 4, 2011 designating the United States.

BACKGROUND OF THE INVENTION

The invention concerns a filter for filtering in particular liquid fluids, in particular fuel or oil, in particular of an internal combustion engine, as well as for de-oiling air. The filter comprises a filter cup in which a filter element is arranged and a filter head that has at least one inlet for the fluid to be filtered and/or at least one outlet for the filtered fluid. The filter head and the filter cup are connected to each other by means of a releasable or detachable bayonet-type rotation/insertion connection and the rotation/insertion connection has at least two interacting locking parts. One of the locking parts is connected to the filter cup and one of the locking parts is connected to the filter head. At least one of the locking parts has at least one locking nose and one of the locking parts has at least one recess that correlates with the locking nose and is provided with an insertion/removal region that enables resistance-free joining and separating of locking nose and recess and is further provided with a locking region where the locking nose is hooked in bayonet fashion. At least one pretensioning element is provided that acts between the filter head and the filter cup for realizing a pretension of the locking nose in the recess.

The invention concerns moreover a filter cup of a filter for filtering in particular liquid fluids, in particular fuel or oil, in particular of an internal combustion engine. The filter cup is suitable for receiving a filter element and is connectable by means of a releasable or detachable bayonet-type rotation/insertion connection to a filter head. The filter cup comprises at least one locking part of the rotation/insertion connection that has at least a locking nose or a recess that interacts with the locking nose of the filter head and is provided with an insertion/removal region that enables resistance-free joining and separating of locking nose and recess and further provided with a locking region where the locking nose is hooked in bayonet fashion. The filter cup further comprises an engagement section for at least one pretensioning element that is acting between the filter head and the filter cup for realizing a pretension of the locking nose in the recess.

The invention concerns moreover a filter head of a filter for filtering in particular liquid fluids, in particular fuel or oil, in particular of an internal combustion engine. The filter head has at least one inlet for the fluid to be filtered and/or at least one outlet for the filtered fluid. The filter head is suitable to be connected by releasable or detachable bayonet-like rotation/insertion connection to a filter cup in which a filter element can be arranged. The filter head has at least a locking nose or at least a recess interacting with the locking nose of the filter cup and provided with an insertion/removal region that enables resistance-free joining and separating of locking nose and recess and further provided with a locking region where the locking nose is hooked in bayonet fashion. The filter head further comprises an engagement section for at least one pretensioning element that is acting between the filter head and the filter cup for realizing a pretension of the locking nose in the recess.

In air filters that are commercially available, a filter cup in which a filter element is arranged is detachably connected by means of a bayonet connection to a filter head. The filter head has an inlet for the air to be filtered and an outlet for the filtered air. The bayonet connection comprises a locking nose that is connected to the filter head. The filter head has a recess that correlates with the locking nose. The recess comprises an insertion/removal region for resistance-free joining and separating of locking nose and recess and a locking region where the locking nose is hooked in bayonet fashion. Between the filter head and the filter cup a pressure spring is arranged with which a pretension of the locking nose in the recess can be realized. It may happen that, when connecting the filter cup with the filter head, the locking nose is not rotated completely into the locking region. This can cause the filter cup to rotate relative to the filter head in operation so that the locking nose then returns into the insertion/removal region and causes the bayonet connection to release. This leads to operational disturbances and can cause destruction of components of a consumer to which the filtered air from the air filter is to be supplied.

It is therefore the object of the present invention to design a filter, a filter cup and filter head of the aforementioned kind in such a way that the filter cup and the filter head can be reliably and securely connected to each other in a simple way. In particular, faulty assembly should be detectable early on as clearly as possible from the exterior, in particular before, at the latest at the time of, start of operation of the filter.

SUMMARY OF THE INVENTION

In accordance with the present invention, this is achieved in that the recess between the locking region and the insertion/removal region has a locking shoulder for the locking nose, wherein the locking shoulder, at the side that correlates with the locking nose, has a shoulder tip and the locking nose, on its side that correlates with the locking shoulder, has a locking tip. The locking tip and the shoulder tip interact in such a way that, when the locking tip and the shoulder tip contact each other, the locking nose glides, caused by the pretension of the pretensioning element, along the locking shoulder either into the locking region or into the insertion/removal region.

According to the invention, a locking shoulder is provided that prevents that the locking nose during operation of the filter can move away from the locking region into the insertion/removal region as a result of an uncontrolled movement of the filter head relative to the filter cup, the movement caused in particular by vibrations of the filter. For connecting the filter cup to the filter head or for separating the filter cup from the filter head, the locking shoulder can be overcome by a targeted movement, particularly an externally applied manual movement, of the filter cup relative to the filter head. The shoulder tip defines upon movement of the locking nose from the insertion/removal region into the locking region a point of no return, i.e., a point where there is no turning back for the locking nose. As soon as the locking tip upon activation of the rotation/insertion connection has passed the shoulder tip, the locking nose by means of pretension of the pretensioning element automatically reaches the locking region. Before this point has been reached, the locking nose automatically returns into the insertion/removal region so that the rotation/insertion connection is released. This can be recognized immediately and clearly, i.e. already before operating the filter, in that the filter cup separates from the filter head. This separation is assisted by the pretension of the pretensioning element. When using the invention in an oil filter or a fuel filter of an internal combustion engine, in case of faulty assembly of the filter cup, the filter cup is separated from the filter head by means of the oil or fuel pressure at the latest when starting the internal combustion engine for the first time; this can be detected in the repair shop. The pointed geometries of the locking tip and of the shoulder tip prevent thus that the locking nose during assembly remains in an unsecured position on the locking shoulder from where it can return in uncontrolled fashion into the insertion/removal region upon operation of the filter. The locking tip and the shoulder tip can be edge-shaped or rounded. The pitch of the flanks of the locking tip and of the shoulder tip affect the mounting force that is required in order to overcome the locking shoulder with the locking nose and the force with which a seal between the filter head and the filter cup is pressed against the correlated sealing surfaces.

In an advantageous embodiment the pretensioning element can be a spring element, in particular a leaf spring or a spiral spring. Spring elements can be produced easily and can be mounted easily. A leaf spring or spiral spring, in particular a spiral pressure spring, can advantageously be attached on the filter head or on the filter cup in such a way that a free end of the spring during mounting is supported on an appropriate engagement section of the filter cup or of the filter head, respectively. In this way, a pretension can be generated simply upon joining the filter cup and the filter head.

In a further advantageous embodiment, the locking nose and the recess can be realized in or on the circumferential walls of the filter cup and of the filter head. In this way, the locking nose and the recess can be arranged in a space-saving and simple way.

Advantageously, the recess can be arranged in a radial outer circumferential wall and the locking region can be realized as a penetration in the circumferential wall. In this way, the locking nose is visible from the exterior as soon as it is arranged in the locking region. In this way, a further checking possibility for assembly is provided and the functional reliability of the filter is increased.

Moreover, advantageously the sides of the locking nose and of the locking region that correlate with each other in the final assembled state of the filter can be designed to be complementary to each other. In this way, the locking nose can be safely and stably secured in the locking region; this increases the functional reliability of the rotation/insertion connection.

In a further advantageous embodiment, the filter head can have a valve, in particular, a check and throttle valve, in particular arranged in the inlet for the fluid, and the filter cup can have an actuation element for the valve. When the filter cup is correctly mounted, the valve can be automatically actuated, in particular opened, by means of the actuation element so that fluid can pass through the filter. In case of faulty assembly, in particular when using a filter cup without the required actuation element, the valve remains inactive, in particular closed. This can be recognized immediately after start of operation of the filter in that no fluid, or only a minimal amount of fluid, can pass through the filter. A check and throttle valve combines advantageously the function of a check valve, i.e., a valve that prevents return of fluid from the consumer to the filter element, with a throttling function for the fluid flow. The degree of throttling action can be preferably automatically adjusted depending on the construction of the employed actuation element. Preferably, when mounting the filter cup, an actuation element that is matched to the employed filter element type can automatically adjust the check and throttle valve with respect to the degree of throttling that is required for the employed filter element. The check valve or non-return function is especially advantageous in particular for use of the filter system with consumers that have extended periods of downtime during which the consumer side of a liquid circuit must not drain empty. This variant is particularly beneficial in particular when using it in emergency power generator.

Advantageously, the actuation element can have a coupling socket that is coaxial to a rotation/insertion axis of the rotation/insertion connection, in particular provided on a central tube or on an end disk of the filter element and connected with the interior of the filter element. The valve can have a valve housing with a connecting socket that is coaxial to the rotation/insertion axis and that is suitable to receive the coupling socket for actuating the valve. Coupling socket and connecting socket that are coaxial to the rotation/insertion axis can be easily combined with the rotation/insertion connection. The coupling socket can be connected monolithically with the central tube that is present anyway on a filter element or the end disk that is present anyway on the filter element. In this way, any type of filter element can be easily provided with its individual actuation element with which in particular the throttling degree of the check and throttle valve can be automatically adjusted upon assembly.

Moreover, advantageously a rim of an end face of the coupling socket that correlates with the valve can be of toothed configuration. The intermediate spaces between the teeth can be easily flowed through by the fluid while the teeth actuate the valve.

The technical object is also solved by the filter cup in that the recess between the locking region and the insertion/removal region has a locking shoulder for the locking nose; the locking shoulder, on the side that correlates with the locking nose, has a shoulder tip and the locking nose on its side that correlates with the locking shoulder has a locking tip. The features and advantages that have been discussed above in connection with the filter according to the invention apply likewise to the filter cup.

The technical object is furthermore solved by the filter head in that the recess between the locking region and the insertion/removal region has a locking shoulder for the locking nose: the locking shoulder, on the side that correlates with the locking nose, has a shoulder tip and the locking nose on its side that correlates with the locking shoulder has a locking tip. The features and advantages that have been discussed above in connection with the filter and the filter cup according to the invention apply likewise to the filter head.

BRIEF DESCRIPTION OF THE DRAWING

Further advantages, features and details of the invention can be taken from the following description in which an embodiment of the invention will be explained in more detail with the aid of the drawing. A person of skill in the art will expediently consider the features disclosed in combination in the drawing, the description, and the claims also individually and will combine them to other meaningful combinations.

FIG. 10 shows schematically a developed view of a circumferential wall of the filter head with two recesses of the rotation/insertion connection of the liquid filter of FIGS. 1 to 9.

FIG. 11 shows schematically a section view of the developed circumferential wall in the area of recesses of FIG. 10 along the section line XI-XI.

In the Figures the same components are referenced with the same reference characters.

DESCRIPTION OF THE PREFERRED EMBODIMENTS

Figure 1:
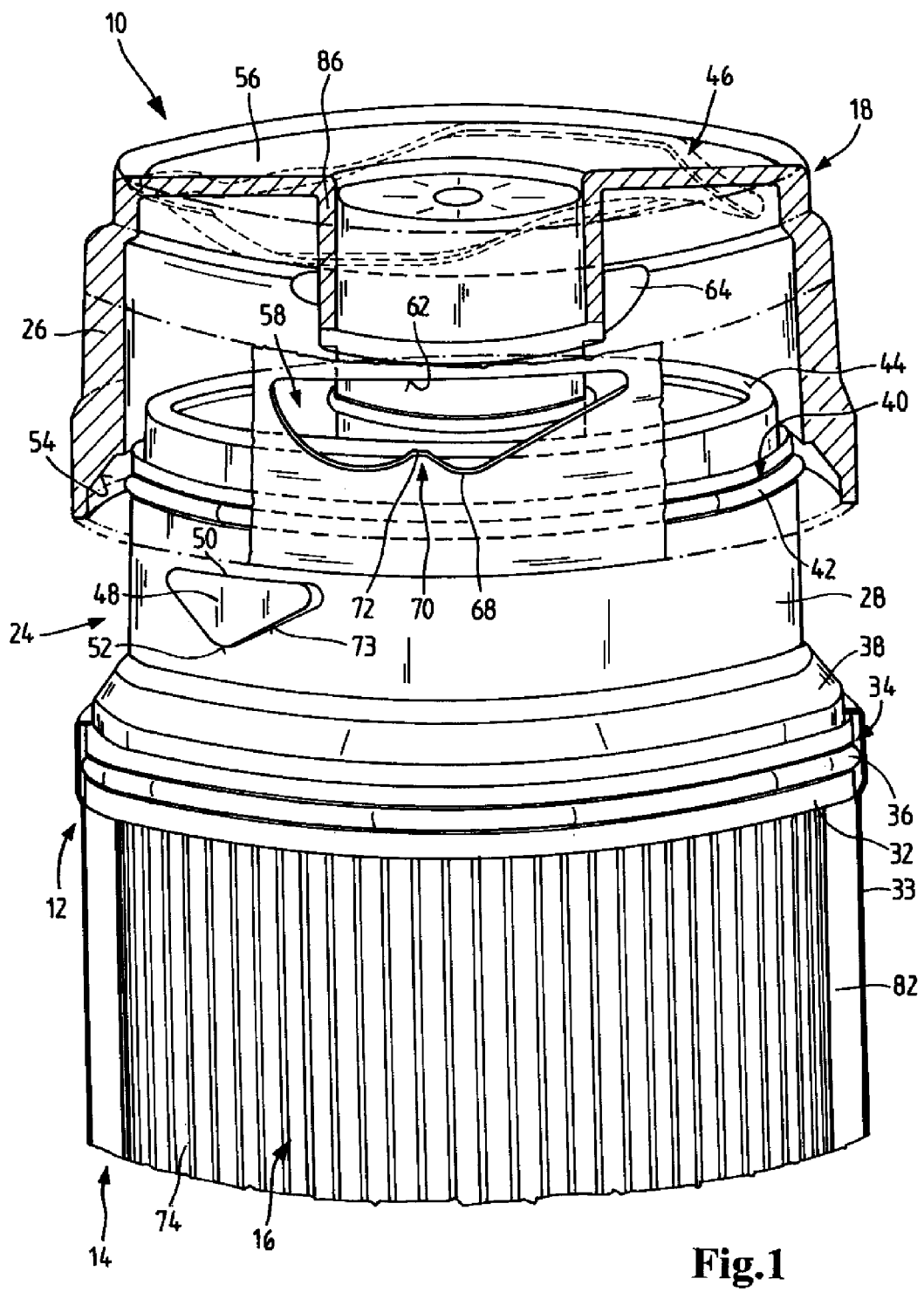
FIG. 1 shows schematically in isometric illustration a liquid filter in a first assembly state upon connecting a filter cup with a filter head by means of a bayonet-type rotation/insertion connection.

In FIGS. 1 to 9 a section of a liquid filter 10 for filtering liquid, for example, fuel or oil, of an internal combustion engine, not shown, of a motor vehicle is illustrated in different assembly states.

The liquid filter 10 comprises a filter housing 12 that is combined of a cylindrical filter cup 14 in which a round filter element 16 is arranged and a filter head 18.

The filter head 18 has an inlet 20 for liquid to be filtered and an outlet 22 for the filtered liquid. For simplifying the drawing, the inlet 20 and the outlet 22 are only schematically indicated in FIG. 2. By means of outlet 22 and inlet 20, the filter head 18 communicates in a way that is not important in connection with the invention with a liquid system, not shown, of an internal combustion engine.

The filter head 14 is connected from below by means of a detachable bayonet-type rotation/insertion connection 24 to the filter head 18.

The rotation/insertion connection 24 comprises a cylinder receptacle 26 provided on the filter head 18 into which a coaxial connecting cylinder 28 of the filter cup 14 is inserted. The connecting cylinder 28 and the cylinder receptacle 26 are made of cast aluminum.

Figure 2:
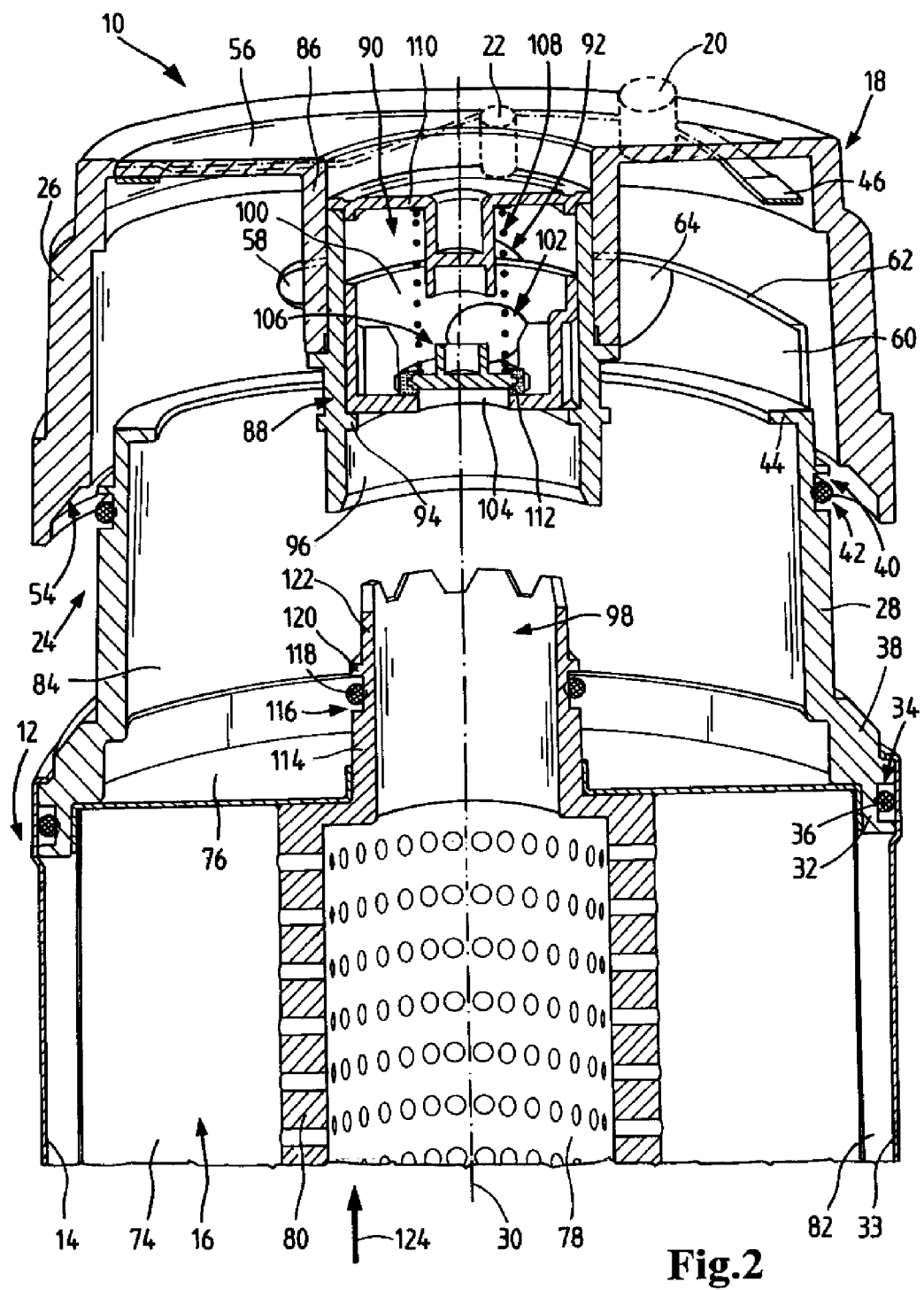
FIG. 2 shows schematically a longitudinal section of the liquid filter of FIG. 1.

The connecting cylinder 28 is a hollow circular cylinder that is open at both end faces and is provided with multiple steps in the direction of the rotation/insertion axis 30 of the rotation/insertion connection 24 shown in FIG. 2.

The connecting cylinder 28 has a circumferential step 32 that is pointing in radial direction outwardly at an end face, facing a bottom of the filter cup 14 (the bottom is not illustrated in FIGS. 1 to 9 in order to simplify the drawings). In radial direction outward, the circumferential step 32 has in its circumferential wall a circumferentially extending cup sealing groove 34 with an annular cup seal 36. The circumferential step 32 is seal-tightly crimped with the edge of a cup housing wall 33 of the filter cup 14. On the side of the circumferential step 32 that is opposite the bottom of the filter cup 14 the radial outer circumferential wall of the connecting cylinder 28 tapers conically to form a cylindrical contact section 38.

Before its free end face that is facing away from the bottom of the filter cup 14, the connecting cylinder 28 has a circumferentially extending head sealing groove 40 with an annular head seal 42. The rim at the free end face of the connecting cylinder 28 is inwardly bent in radial direction and forms an engagement section 44 for a leaf spring 46 that is arranged in the cylinder receptacle 26 and will be explained in the following.

The connecting cylinder 28 comprises two identical locking noses 48 of which one is visible in FIG. 1. The locking noses 48 are located on diametrically opposed sides relative to the rotation/insertion axis 30. They project away from the outer circumferential side in radial direction. Viewed in radial direction, each locking nose 48 has the shape of a triangle whose tips are rounded. A guide surface 50 of the locking nose 48 extends in the circumferential direction on the triangle side that is facing away from the bottom of the filter cup 14. A locking tip 52 of the locking nose 48 points to the bottom of the filter cup 14.

Into the open side of the cup-shaped cylinder receptacle 26 the connecting cylinder 28 is inserted so that the circumferential wall of the cylinder receptacle 26 surrounds the connecting cylinder 28 externally in radial direction. The radial inner circumferential side of the cylinder receptacle 26 is stepped so as to match in a complementary fashion the radial outer circumferential side of the connecting cylinder 28. In the area of the open end face of the cylinder receptacle 26 there is accordingly a conical receptacle contact section 54 which matches the cylinder contact section 38. The leaf spring 46 is supported on the bottom 56 of the cylinder receptacle 26 that forms the engagement section of the filter head. The spring 46 is attached to the cylinder receptacle 26 in a way that is not important in the context of the invention.

The cylinder receptacle 26 comprises two recesses 58 provided in its radial inner circumferential wall; the recesses 58 correlate with the locking noses 48 of the connecting cylinder 28. The size of the recesses 58 and of the locking noses 48 in radial direction are matched to each other such that the locking noses 48 can be moved without resistance within the recesses 58. A developed view of the circumferential wall of the connecting cylinder 28 with the two recesses 58 is illustrated in FIG. 10. For better orientation, in FIG. 10 a projection of the rotation/insertion axis 30 is illustrated. FIG. 11 shows a section of the developed view of the circumferential wall of FIG. 10 in the area of its recesses 58 along the section line XI-XI.

Each recess 58 comprises an insertion/removal region 60 substantially extending in axial direction. The insertion/removal region 60 opens into the receptacle contact section 54. In the leading area of the receptacle contact section 54 between the mouth of the insertion/removal region 60 and the free edge of the cylinder receptacle 26, the spacing in radial direction between the receptacle contact section 54 and the rotation/insertion axis 30 is greater than the spacing in radial direction between the insertion/rotation axis 30 and the back wall of the insertion/removal region 60 so that the locking nose 48 can be freely moved without resistance in this area. A translation surface 62 that extends at a slant to the rotation/insertion axis 30 delimits the insertion/removal region 60 at its end that is opposite the mouth into the receptacle contact section 54.

Figure 4:
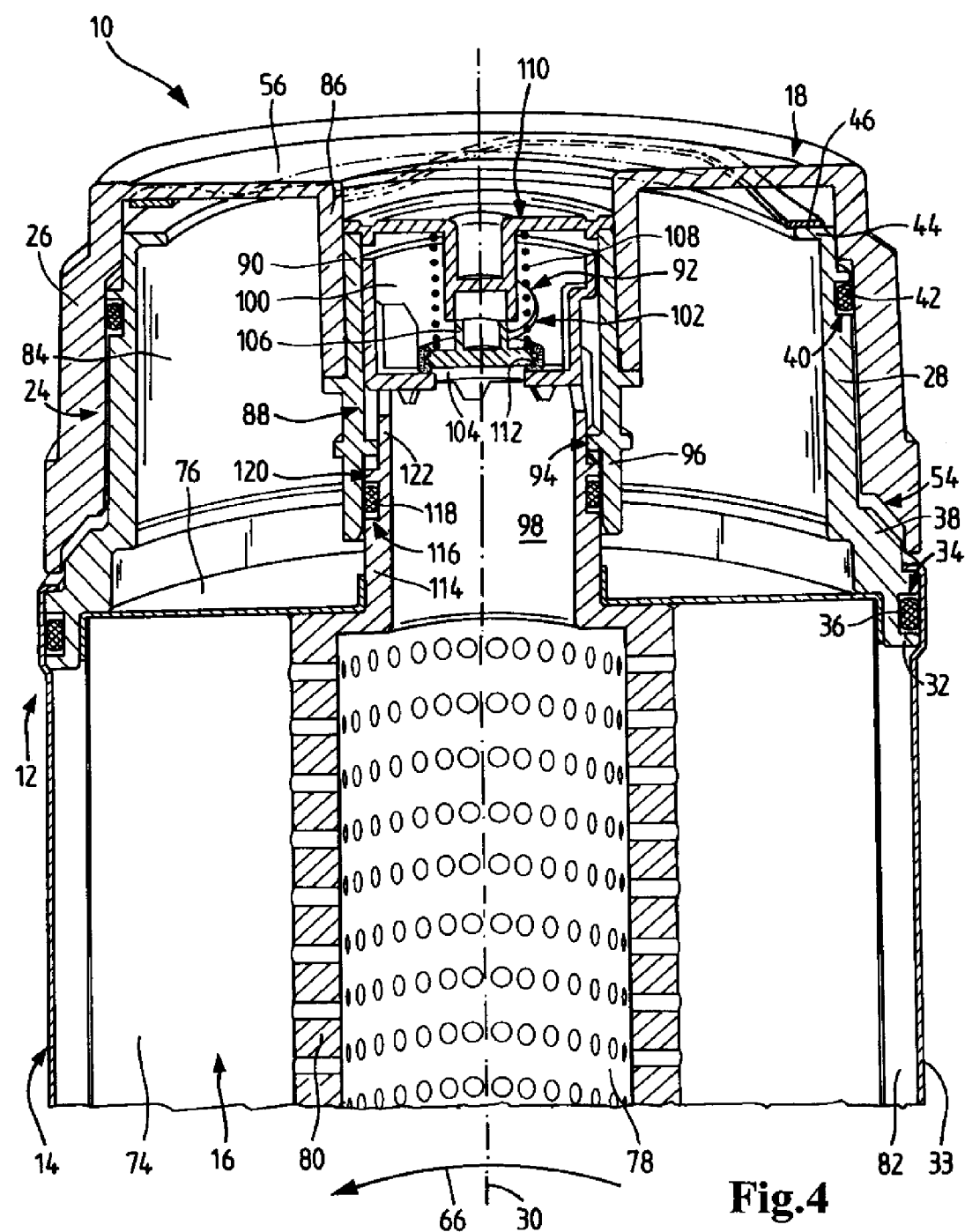
FIG. 4 shows schematically a longitudinal section of the liquid filter as shown in FIG. 3.

As shown in FIG. 10, the insertion/removal region 60 is adjoined by a locking region 64 that is realized in the form of a penetration in the circumferential wall of the cylinder receptacle 26. The locking region 64 extends rearwardly of the insertion/removal area 60, viewed in the circumferential direction, relative to the rotational closing direction of the filter cup 14. The rotational closing direction is indicated in FIGS. 4 and 10 by arrow 66. The translation surface 62 of the insertion/removal region 60 has at the transition into the locking region 64 a slight bent shown in FIGS. 9 and 10.

The locking region 64 is delimited on the side that is opposite the translation surface 62 in axial direction by V-shaped closing contact surface 68. The closing contact surface 68 and the translation surface 62 taper in the rearward section of the locking region 64 in a V-shape toward each other. The closing contact surface 68 as a whole is complementary to a locking side 73 of the locking nose 48 provided with the locking tip 52.

The closing contact surface 68 passes into a locking shoulder 70 for the locking nose 48 that is located between the locking region 64 and the insertion/removal region 60. The rearward flank of the locking shoulder 70 in the rotational closing direction forms the forward part of the closing contact surface 68. The locking shoulder 70 projects in axial direction into the recess 58. It is provided with a rounded shoulder tip 72 at its side that is facing away from the free edge of the cylinder receptacle 26 and that correlates with the locking nose 48 of the filter cup 14 when mounting the liquid filter 10.

In the filter cup 14 the filter element 16 which is coaxial to the rotation/insertion axis 30 is arranged. The filter element 16 comprises a zigzag-shaped filter medium 74 whose end faces each are connected to an end disk 76. In FIGS. 2, 4, 6, 8 only the end disk 76 facing the filter head 18 is illustrated.

In the interior 78 of the filter element 16 that constitutes the clean side, a central tube 80 extends between the end disks 76 coaxially to the insertion/rotation axis 30. The central tube 80 has in its circumferential wall numerous passages for the liquid. The end disk 76 facing the filter head 18 has an opening that is coaxial to the central tube 80.

Radially outside of the filter element 16, on the unfiltered side of the filter element 16, an annular cup space 82 is provided. The liquid to be filtered flows through the filter element 16 from the annular cup space 82 to the interior 78.

The annular cup space 82 is connected with connecting lines, not illustrated for simplifying the drawings in FIGS. 1 to 9, with the annular inlet space 84. The annular inlet space 84 is located in the interior of the connecting cylinder 28 and is delimited by the end disk 76 and, in the final assembly state of the liquid filter 10, delimited by the bottom 56 of the cylinder receptacle 26. The inlet 20 of the filter head 18 opens into the annular inlet space 84.

At the bottom 56 of the cylinder receptacle 26 there is a valve receptacle 86 in the form of a hollow cylinder that is open at both end faces and is coaxial to the insertion/rotation axis 30; it surrounds a coaxial opening provided at the bottom 56. The valve receptacle 86 extends into the interior of the cylinder receptacle 26.

In the valve receptacle 86, a check and throttle valve 88 is mounted. The check and throttle valve 88 has a cup-shaped valve housing 90 that opens toward the open end face of the cylinder receptacle 26. The valve housing 90 has circumferentially a liquid outlet opening 92 that extends to the outlet 22; opening 92 is shown in FIGS. 2, 4, 6 and 8. The outlet 22 extends along the valve receptacle 86 and through the bottom 56 of the filter head 18.

Between the liquid outlet opening 92 and the open end face of the valve housing 90 there is a circumferentially extending projection 94 on the radial inner circumferential side. The section of the circumferential wall of the valve housing 90 that in axial direction is arranged on the side of the projection 94 that is opposite the liquid outlet opening 92 serves as a connecting socket 96 for a coupling socket 98 of the filter element 16 that will be explained in the following. The edge at the free end face of the connecting socket 96 is slanted at the radial inner side for facilitating assembly.

A cup-shaped throttle valve piston 100 is arranged in the valve housing 90 so as to be movable in axial direction. The bottom of the throttle valve piston 100 is located on the side that is facing the open end face of the valve housing 90. It has a through opening 104 for the liquid. On the circumference, the throttle valve piston 100 has a liquid valve opening 102 which is aligned with the liquid outlet opening 92 in the top position illustrated in FIG. 8; in the top position the check and throttle valve 88 has a minimal throttle action.

The check valve piston 106 is arranged within the throttle valve piston 100 to be slidable in axial direction relative to the piston 100. The through opening 104 can be closed by the check valve piston 106. On the side that is facing away from the through opening 104, the check valve piston 106 has a receiving sleeve in which an end of the spiral spring 108 is positioned. The spiral spring 108 is supported on the check valve piston 106. The opposite end of the spiral spring 108 is pushed over a sleeve of a housing lid 110 of the valve housing 90 and is supported on the housing lid 110. The spiral spring 108 is compressed in the upper position of the throttle valve piston 100 and exerts a closing force on the check valve piston 106. The closing force forces the check valve piston 106 against a sealing surface surrounding the through opening 104 at the bottom of the throttle valve piston 100 so that the through opening 104 is closed at the clean side of the filter element 16 below a certain liquid pressure.

The check valve piston 106 has moreover a valve piston seal 112. The valve piston seal 112 rests seal-tightly on the sealing surface in the closed position of the throttle valve piston 100.

The tubular coupling socket 98 of polyamide serves as an actuation element for the check and throttle valve 88. The coupling socket 98 is coaxial to the rotation/insertion axis 30. It is monolithically connected with an end face of the central tube 80 of the filter element 16 and is thus connected to the filter cup 14. The coupling socket 98 projects through the central opening of the end disk 76 and is open toward the interior 78 of the filter element 16. The rim of the free end face of the coupling socket 98 is toothed.

The sealing section 114 of the coupling socket 98 adjoining the central tube 88 has at its radial outer circumferential side a sealing groove 116 with an annular seal 118. The outer diameter of the sealing section 114 is smaller than the inner diameter of the connecting socket 96 of the valve housing 90 and greater than the inner diameter of the projection 94 of the valve housing 90.

In the axial direction away from the central tube 88 and behind the sealing section 114, a radially outwardly extending contact stop 120 is adjoined by an actuation section 122. The outer diameter of the actuation section 122 is smaller than the inner diameter of the projection 94 of the valve housing 90.

For mounting the liquid filter 10 in the first mounting stage, as shown in FIGS. 1 and 2, the filter cup 14, with the connecting cylinder 28 leading, is inserted from below in the direction of arrow 124 axially relative to the rotation/insertion axis 30 into the cylinder receptacle 26 of the filter head 18. The conical receptacle contact section 54 of the cylinder receptacle 26 facilitates in this connection centering of the connecting cylinder 28. It may be required to somewhat rotate the filter cup 14 relative to the filter head 18 about the rotation/insertion axis 30 in order to align the locking noses 48 with the insertion/removal regions 60 of the recesses 58. The locking noses 48 upon further insertion are moved without meeting resistance in the insertion/removal regions 60 the.

Upon insertion of the filter cup 14 into the filter head 18, the coupling socket 98 is immersed into the connecting socket 96 of the check and throttle valve 88.

Figure 3:
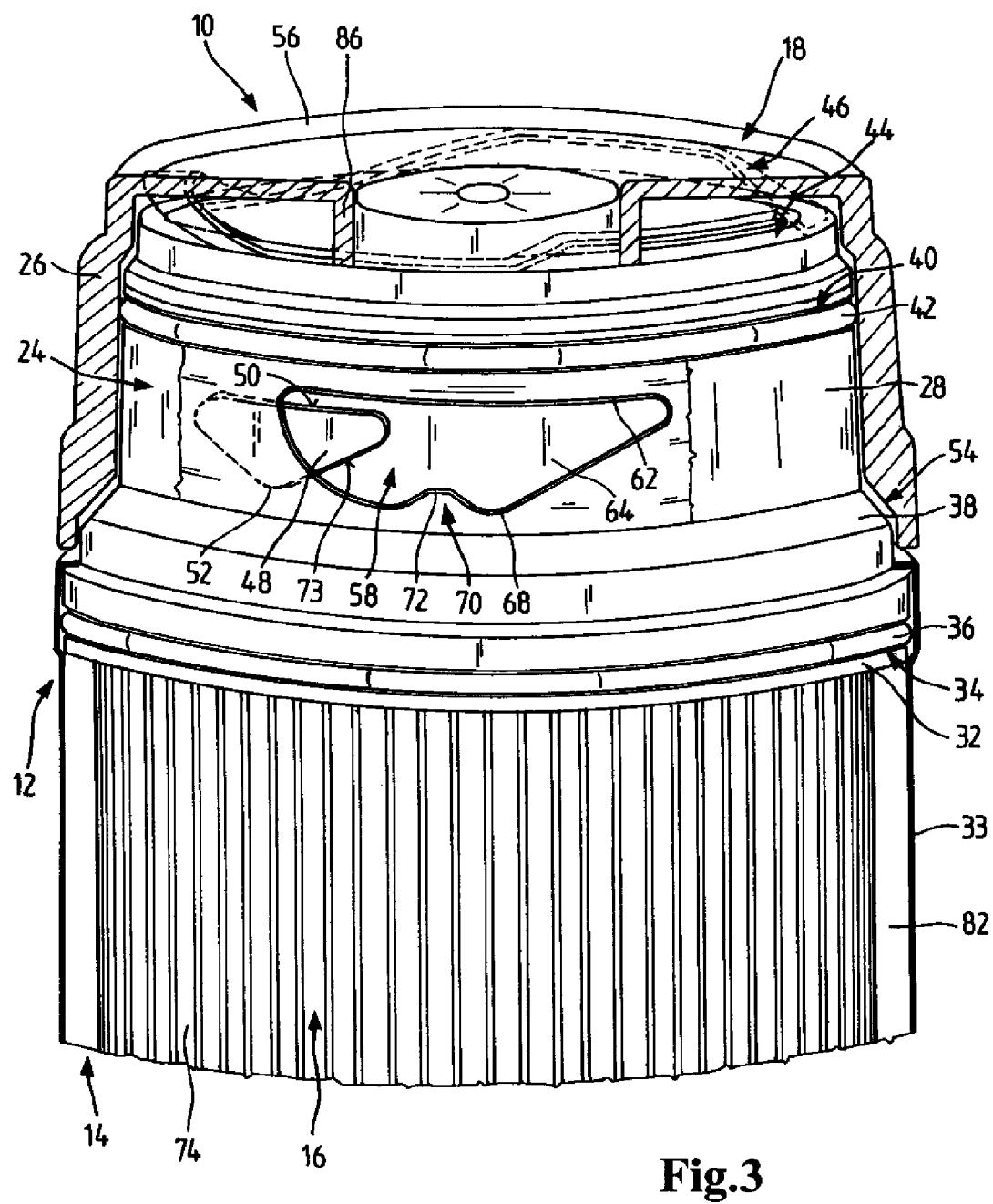
FIG. 3 shows schematically in isometric illustration the liquid filter of FIGS. 1 and 2 in a second assembly state.

Upon further insertion of the connecting cylinder 28 into the cylinder receptacle 26, in a second assembly position, illustrated in the FIGS. 3 and 4, the free side of the leaf spring 46 contacts the engagement section 44 of the connecting cylinder 28. By means of the leaf spring 46 a pretension between filter head 18 and filter cup 14 is realized in axial direction.

Subsequently, the filter cup 14 is rotated relative to the filter head 18 in rotational closing direction 66 about the rotation/insertion axis 30. When doing so, the locking noses 48, depending on the insertion depth, are guided across the locking shoulder 70 into the locking region 64 by the translation surface 62 or by the slanted flanks of the locking shoulders 70 that are leading in the closing direction 66; this facilitates mounting.

When a wrong coupling socket 98 is used whose contact stop 120 impacts on the projection 94 before the locking noses 48 are positioned at the level of the gaps between the shoulder tips 72 and the translation surface 62, the locking noses 48 cannot pass the locking shoulders 70 so that the rotation/insertion connection 24 cannot be activated. The locking noses 48 are returned into the insertion/removal regions 60 and the filter cup 14 is then pushed out of the cylinder receptacle 26 by means of the pretension of the leaf spring 46.

Figure 5:
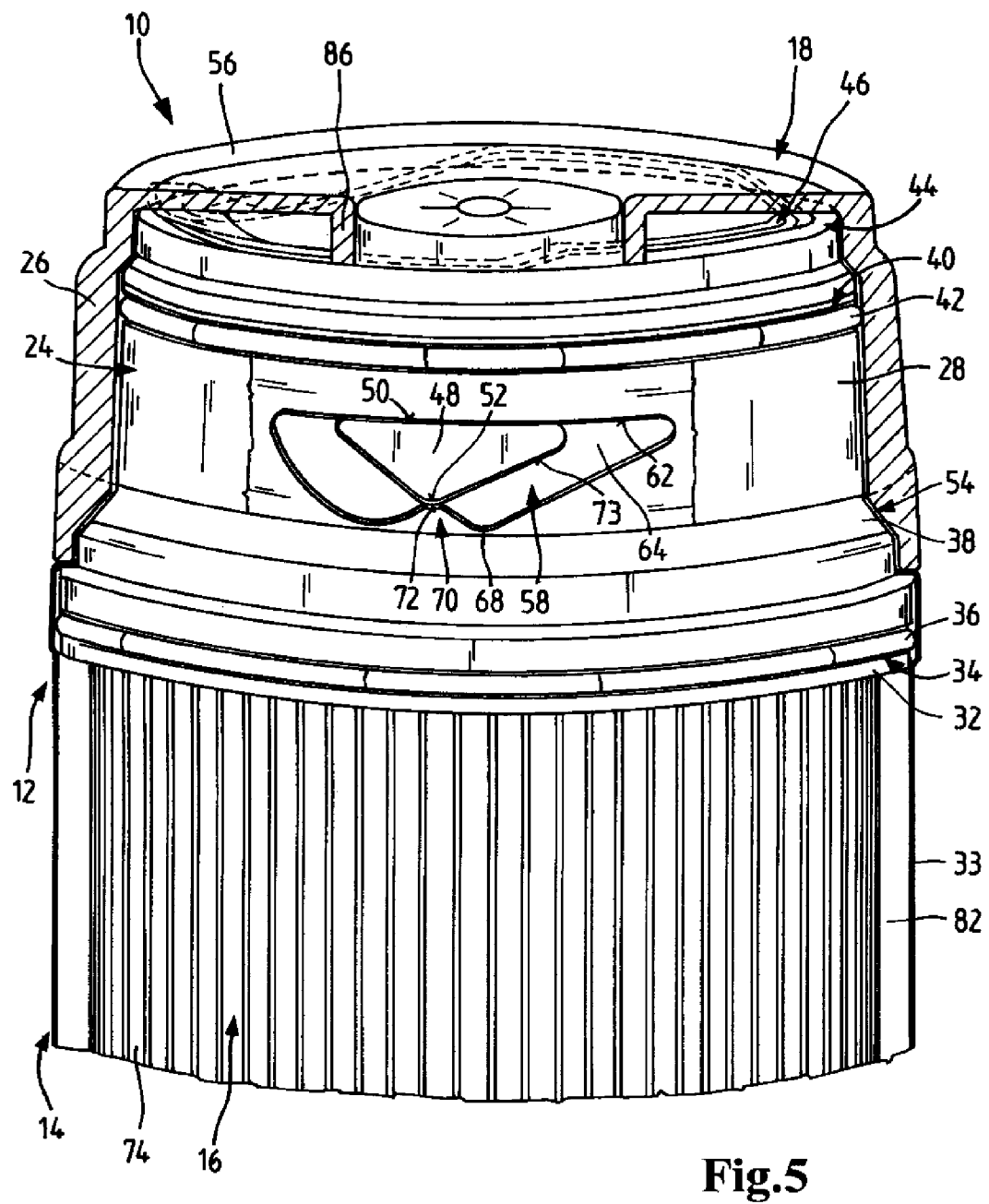
FIG. 5 shows schematically in isometric illustration the liquid filter of FIGS. 1 to 4 in a third assembly state.
Figure 6:
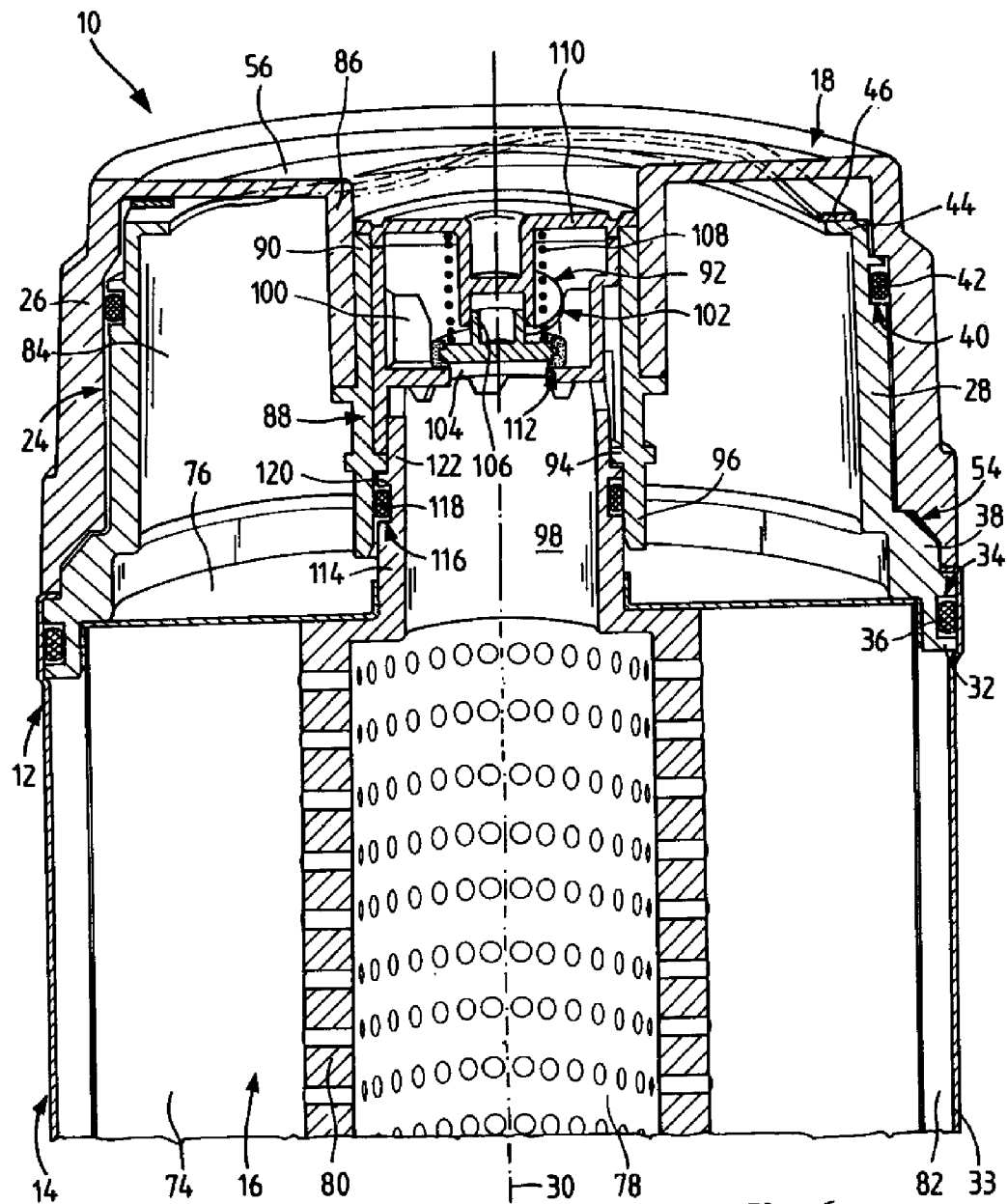
FIG. 6 shows schematically in longitudinal section the liquid filter as shown in FIG. 5.

In the FIGS. 5 and 6, a third mounting stage is illustrated in which the locking tips 52 of the locking noses 48 and the shoulder tips 72 of the locking shoulders 70 rests on each other.

In case that the locking tips 52 upon premature stopping of the rotation movement imparted from the exterior in the rotational closing direction 66 have not yet passed the shoulder tips 72, the pretension of the spring 46 causes the locking noses 48 to be guided across the slanted flanks of the locking shoulders 70 that are leading in the closing direction 66 so that the locking noses 48 are returned into the insertion/removal region 60. From here, the locking noses 48 are forced out of the insertion/removal regions 60 without meeting resistance. The filter cup 14 is thus immediately separated from the filter head 18; this is detected easily.

The pointed geometries of the locking noses 48 and of the locking shoulders 70 prevents thus that the locking noses 48 remain on the locking shoulders 70 from where, at a later point in time, for example, even after an extended operating period, they could return into the insertion/removal regions 60 so that the connection between the filter head 18 and the filter cup 14 could become separated.

When in case of premature stopping of the external rotational movement the locking tips 52 have already passed the shoulder tips 72, the pretension of the leaf spring 46 ensures that the locking noses 48 are forced into the locking region 64 across the slanted flanks of the closing contact surfaces 68 that are leading in the rotational closing direction 66.

Figure 7:
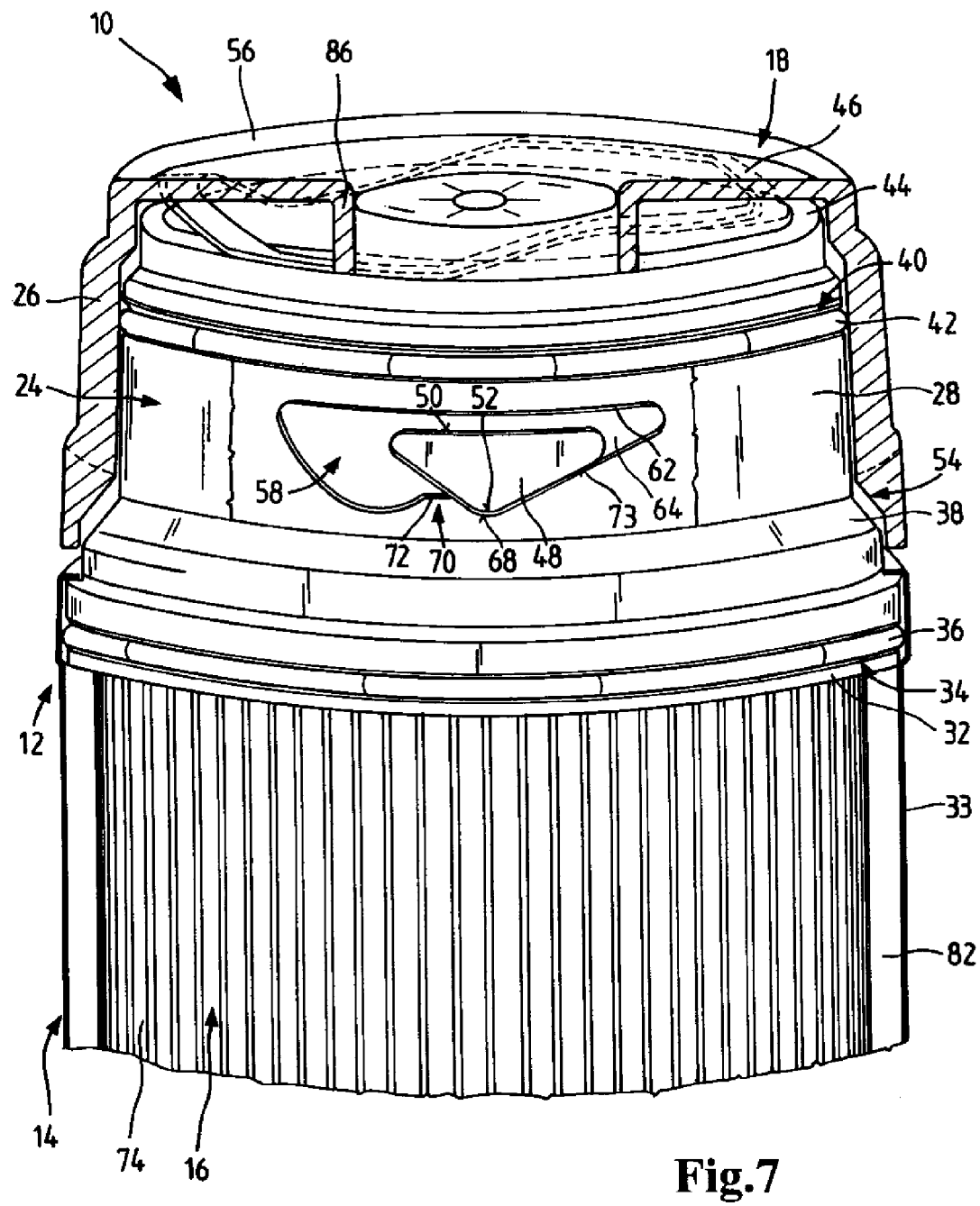
FIG. 7 shows schematically in isometric illustration the liquid filter of FIGS. 1 to 6 in the final assembly state.
Figure 8:
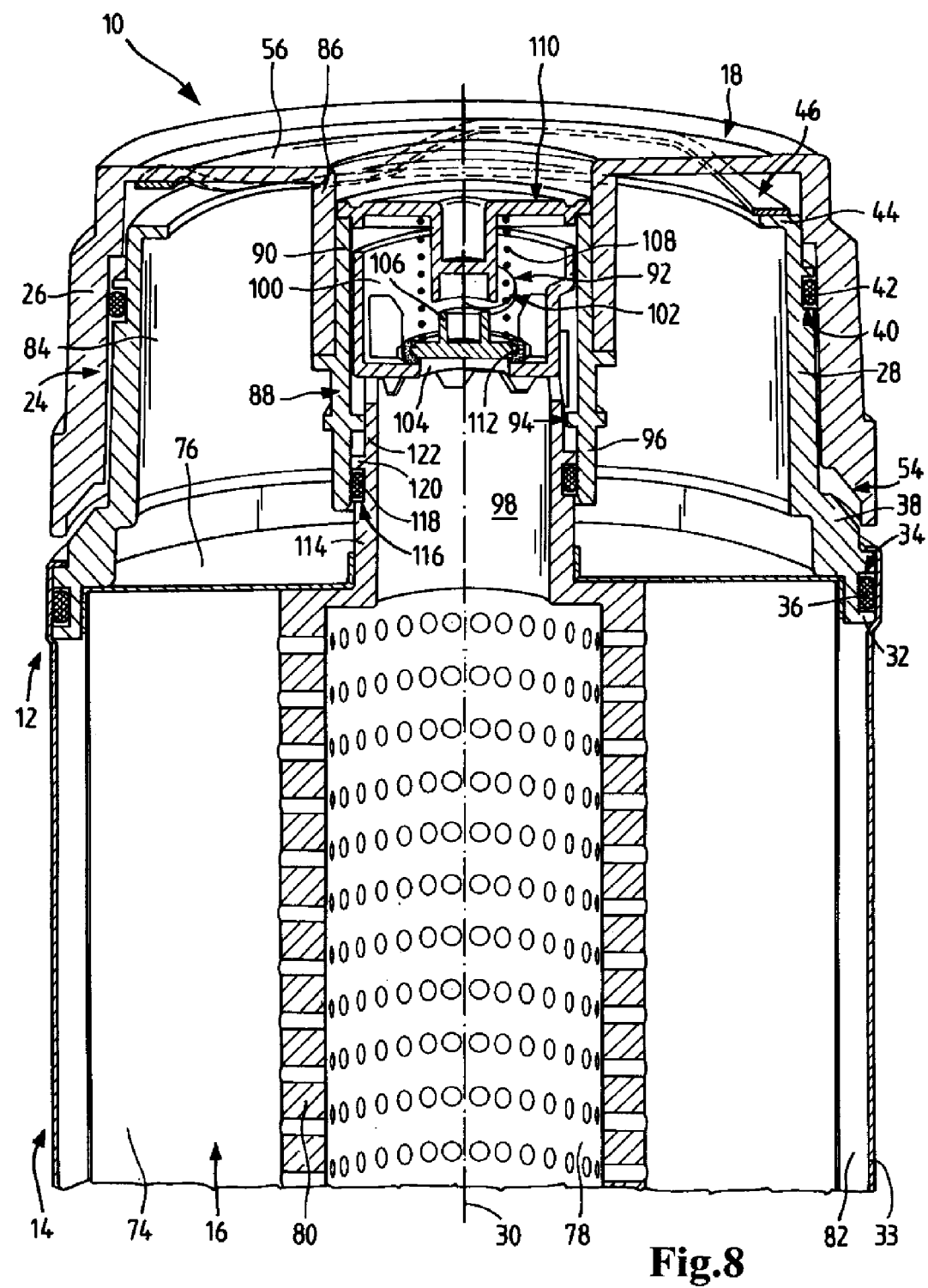
FIG. 8 shows schematically a longitudinal section of the liquid filter as shown in FIG. 7.
Figure 9:
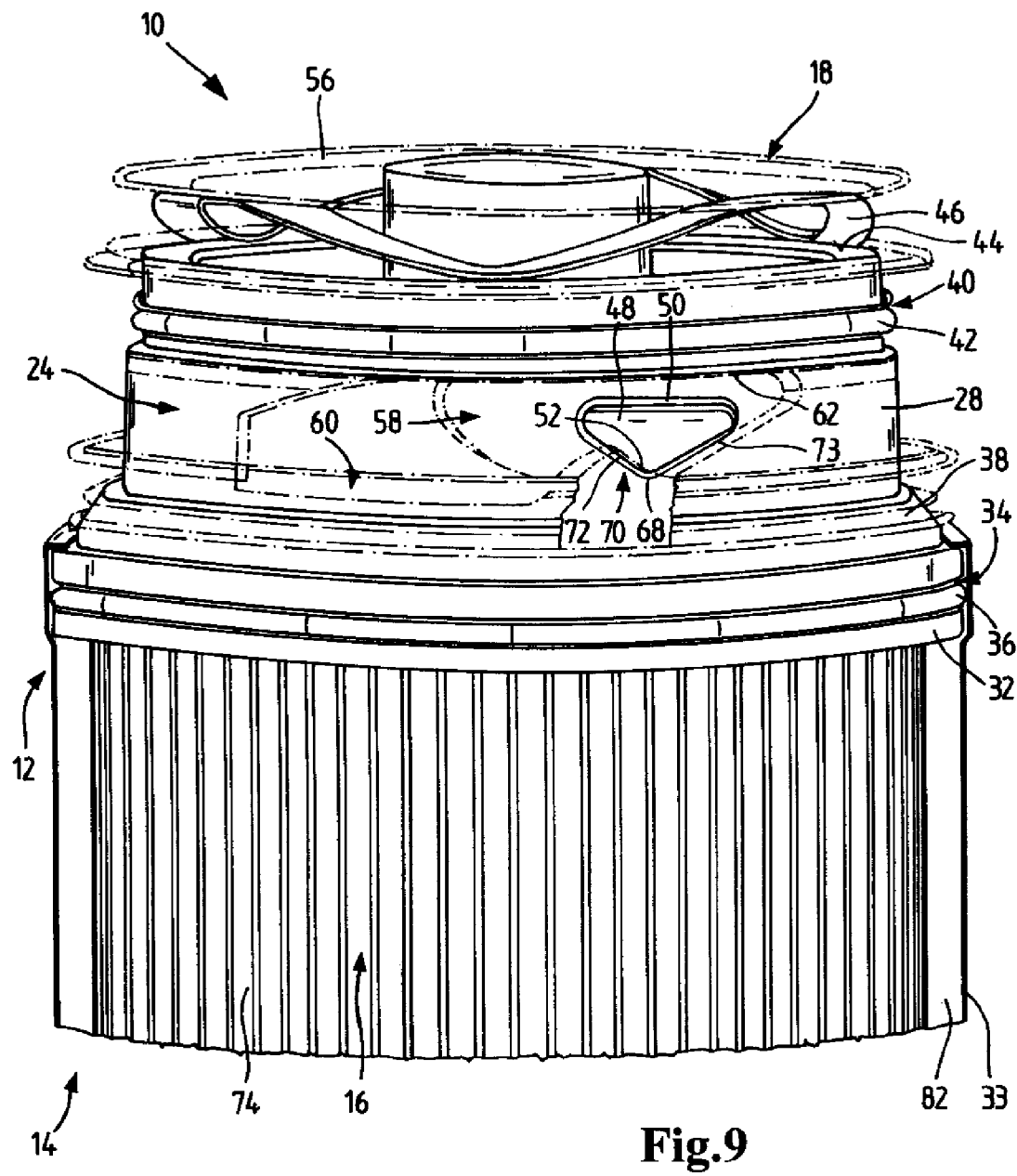
FIG. 9 shows schematically in isometric illustration the liquid filter of FIG. 7 with the filter head removed.

In the final assembly state of the liquid filter 10 that is illustrated in FIGS. 7 and 8, the locking noses 48 interlock in a bayonet-type arrangement in the locking regions 64. The locking sides 73 of the locking noses 48 are resting flat and stably on the closing contact surfaces 68. The locking noses 48 are then visible from the exterior in the penetration of the locking region 64.

In case of correctly mounted filter cup 14 when a filter element 16 with a matching coupling socket 98 is used, the toothed end face of the coupling socket 98 impacts on the bottom of the throttle valve piston 100 in the final assembly state and forces it against the spring force of the spiral spring 108 toward the housing lid 110 so that the outlet opening 92 for the liquid and the valve opening 102 for the liquid are aligned with each other. The check and throttle valve 88 is open in the through flow direction. By varying the axial expansion for different coupling sockets for different filter elements, it is possible to predetermine different throttling levels for the check and throttle valve 88.

When using a filter element 16 of a different configuration that has no or a different type of coupling socket 98 that is not suitable for moving the throttle valve piston 100 toward the housing lid 110 or when the filter cup 14 is not correctly mounted, the outlet opening 92 for liquid and the valve opening 102 for liquid overlap each other too little or not at all so that liquid flow through the outlet 22 is throttled. This can be detected in a simple way already at the start of operation of the liquid filter 10 in that there is minimal or nonexisting liquid flow. The check and throttle valve 88 therefore combines a check valve function for the liquid flow out of the outlet 22 with the throttling function in particular for detecting faulty assembly. The check valve function also prevents that the consumer side will run empty when the consumer is not in operation.

In all of the above described embodiments of a liquid filter 10 the following modifications are possible inter alia.

The invention is not limited to the use in connection with internal combustion engines of motor vehicles. Instead, it can also be used for different types of internal combustion engines, for example, also for industrial motors or compressors. The invention can also be used for filters for filtering different types of liquid or gaseous fluids.

The filter cup 14, instead of being mounted in a suspended position, can also be mounted in upright position from above or at a slant on an appropriately oriented filter head 18.

Instead of the round filter element 16 also a different type of filter element 16, for example, a square or rectangular or oval filter element can be provided. The housing wall 33 of the filter cup 14 can have different shapes, such as a conical shape, instead of the cylindrical shape that is shown.

The filter element 16, instead of having a zigzag-folded filter medium 74, can also have a differently embodied filter medium.

The cylinder receptacle 26 and the connecting cylinder 28, instead of being made of cast aluminum, can also be made of a different type of material, for example, a different metal, a plastic material or a mixed material.

In place of the connecting cylinder 28 with locking noses 48 and the cylinder receptacle 26 with recesses 58, it is also possible to have at least two locking components that interact with each other in a different way.

The connecting cylinder 28 with the locking noses 48, instead of being connected to the filter cup 14, can also be connected to the filter head 18. Accordingly, the cylinder receptacle 26 with the recesses 58 is then connected to the filter cup 14.

The locking noses 48, instead of being connected to the connecting cylinder 28, can also be arranged in the cylinder receptacle 26. Accordingly, the recesses 58 are then provided in the connecting cylinder 28.

It is also possible to provide more or fewer than two locking noses 48 and/or more or fewer than two recesses 58.

The locking noses and the correlated recesses, instead of being identical, can also be differently designed. They can also be arranged asymmetrically relative to the rotation/insertion axis. In this way, the orientation of the filter cup on the filter head can be predetermined by means of the position and/or shape of the locking nose/recess pairs.

The locking tips 52 of the locking noses 48 and the shoulder tips 72 of the locking shoulders 70, instead of being rounded, can also be of an angled configuration.

In place of the leaf spring 46, a different kind of pretensioning element, for example, a spiral spring or an elastic element, for example, of plastic material, can be used.

Instead of being connected with the central tube 80, the coupling socket 98 can be connected to an appropriate end disk of the filter element 16.

The coupling socket 98 can be made of a material other than polyamide, preferably however of a plastic material.

While specific embodiments of the invention have been shown and described in detail to illustrate the inventive principles, it will be understood that the invention may be embodied otherwise without departing from such principles.

What is claimed is:

1. A filter for filtering a fluid, the filter comprising:
a filter cup;
a filter element arranged in an interior of said filter cup;
a filter head comprising at least one of an inlet for a fluid to be filtered and an outlet for the filtered fluid;
said filter cup and said filter head connected to each other by a releasable bayonet rotation/insertion connection rotating about a rotation insertion axis (30), the bayonet rotation/insertion connection comprises at least two locking parts that interact with each other and one of the at least two locking parts is connected to each of said filter cup and said filter head, respectively;
wherein an axial direction an defined by the rotation insertion axis (30) and a radial direction is a direction traverse to the axial direction;
wherein the rotation/insertion connection comprises:
a first locking part arranged on one of the filter cup or the filter head, the first locking part having:
a locking nose arranged on and protruding radially from a circumferential wall of the filter cup or the filter head;
a second locking part formed on the other one of the filter head or the filter cup, formed into a circumferential wall, wherein the second locking part includes:
an insertion/removal region formed as a recess formed into the respective circumferential wall;
a locking region adjoining the insertion removal region;
wherein the locking nose is configured to lockably engage into the locking region;
a spring pretensioning element acting between said filter cup and said filter head and generating a pretension acting on said locking nose in said recess;
wherein said recess has a locking shoulder positioned between said locking region and said insertion/removal region and interacting with said locking nose;
wherein said locking shoulder has a shoulder tip on a side correlated with locking nose;
wherein said locking nose has a locking tip on a side correlated with said locking shoulder;
wherein said locking nose, when said locking tip and said shoulder tip contact each other, is forced by the pretension of said pretensioning element into said locking region or into said insertion/removal region;
wherein the filter cup includes
an axially extending coupling socket connected to the filter cup;
wherein the filter head includes
a valve receptacle formed on the filter head and extending inwardly into an interior of the filter head, the valve receptacle having an interior opening at an open end face of the valve receptacle;
a check or throttle valve arranged at an open end face of the valve receptacle, the check or throttle valve having
a valve housing mounted on the valve receptacle;
a throttle piston valve arrange in an interior of the valve housing and configured to operate by axial movement within an valve housing;
a connecting socket arranged at an axial inner end of the check or throttle valve, the connecting socket configured to engage with and receive the coupling socket connected to the filter cup, the coupling socket configured as an actuation element to interact with and axially move the throttle piston valve;
wherein the coupling socket engaged with the connecting socket forms a flow channel connecting an interior of the filter element to the check or throttle valve;
wherein the coupling socket engaging against the a piston of the check or throttle valve to actuate the check or throttle valve.

2. The filter according to claim 1, wherein said pretensioning element is a spring element.

3. The filter according to claim 2, wherein said spring element is a leaf spring or a spiral spring.

4. The filter according to claim 1, wherein sides of said locking nose and of said locking region that correlate with each other in a final assembly position of the filter are complementary to each other.

5. The filter according to claim 1, wherein said check or throttle valve is arranged in said inlet of said filter head.

6. The filter according to claim 1, wherein said actuation element is coaxial to a rotation/insertion axis of said rotation/insertion connection, wherein said connecting socking is coaxial to said rotation/insertion axis.

7. The filter according to claim 6, wherein said coupling socket is connected to a central tube of said filter element or to an end disk of said filter element.

8. The filter according to claim 6, wherein said coupling socket has an end face that is facing said valve and said end face has a toothed rim.

9. The filter according to claim 1, wherein the locking nose is a triangular locking nose;
wherein said locking tip comprises a first tip of the triangular locking nose rides over the shoulder tip of the locking shoulder and engages against the locking shoulder of the locking region to lockably hook into the locking region;
wherein a top side of the locking region opposite the locking shoulder has a translation surface on which a side of the triangular locking nose, opposite the first tip, rides in the locking region.

* * * * *